United States Patent [19]

Staar

[11] Patent Number: 4,473,280

[45] Date of Patent: Sep. 25, 1984

[54] AUDIO-VISUAL CARTRIDGE AND COMBINED AUDIO PLAYER AND VISUAL VIEWER

[75] Inventor: Marcel J. Staar, Brussels, Belgium

[73] Assignee: Staar S. A., Belgium

[21] Appl. No.: 543,233

[22] Filed: Oct. 21, 1983

Related U.S. Application Data

[63] Continuation of Ser. No. 380,443, May 20, 1982, abandoned.

[30] Foreign Application Priority Data

| May 22, 1981 [BE] | Belgium | 204,876 |
| Mar. 1, 1982 [BE] | Belgium | 207,439 |
| Mar. 19, 1982 [BE] | Belgium | 207,618 |

[51] Int. Cl.³ .............................................. G03B 21/10
[52] U.S. Cl. ...................................... 353/19; 353/120; 353/7; 353/110
[58] Field of Search ............. 353/16, 15, 18, 19, 353/110, 120, 7; 40/362, 363, 366, 367, 455, 456; 206/456, 309, 311, 312; 360/1, 2, 80

[56] References Cited

U.S. PATENT DOCUMENTS

| 2,961,922 | 11/1960 | Schwartz et al. | 353/16 |
| 3,083,485 | 4/1963 | Wagenseil | 206/309 X |
| 3,296,925 | 1/1967 | Yamamoto | 353/19 X |
| 3,484,160 | 12/1969 | Glass et al. | 353/16 X |
| 3,517,991 | 6/1970 | Bender | 360/2 X |
| 3,556,654 | 1/1971 | Stapleton | 353/15 |
| 3,583,808 | 6/1971 | Glass et al. | 353/15 X |
| 3,829,207 | 8/1974 | Licitis . | |
| 3,836,241 | 9/1974 | Staar . | |
| 3,868,178 | 2/1975 | Dimitracopoulos . | |
| 4,014,604 | 3/1977 | Schwartz . | |

FOREIGN PATENT DOCUMENTS

| 2152263 | 7/1979 | Fed. Rep. of Germany | 360/1 |
| 2292994 | 7/1976 | France | 353/15 |
| 1170403 | 11/1969 | United Kingdom . | |
| 1181572 | 2/1970 | United Kingdom . | |

Primary Examiner—Harry N. Haroian
Attorney, Agent, or Firm—Leydig, Voit, Osann, Mayer and Holt, Ltd.

[57] ABSTRACT

An audio-visual cartridge containing two coplanar adjacent rotatable discs, a visual disc carrying a plurality of picture transparencies mounted in a ring for successive viewing and an audio disc having sound recording tracks on a face thereof for individual sound recordings corresponding to transparencies, the cartridge being in the form of a flat envelope having a first and second internal compartment disposed in coplanar relation for accommodating the discs. An apparatus for reproducing recordings while a user views transparencies on discs contained in an audio-visual cartridge is provided with a manual selector for rotating the visual disc and a motor drive for rotating the audio disc, an optical viewer for reading the transparencies, an audio device for reading sound tracks and reproducing recordings and a circuit and mechanism for coordinating the rotation of the discs so that individual recordings corresponding to transparencies are reproduced while the corresponding transparencies are being viewed.

37 Claims, 14 Drawing Figures

AUDIO-VISUAL CARTRIDGE AND COMBINED AUDIO PLAYER AND VISUAL VIEWER

This application is a continuation, of application Ser. No. 380,443, filed May 20, 1982 now abandoned.

TECHNICAL FIELD

The present invention relates to a cartridge comprising visual and audio information carrying discs and to an apparatus for the simultaneous reproduction of the visual and audio information carried on said information carrying discs.

BACKGROUND ART

Various cartridges generally of a rigid material are known which contain an audio information carrying element associated with a film transparency. However, there is a need for a cartridge containing an audio information carrying disc associated with a disc carrying a plurality of film transparencies to permit each transparency or each pair of transparencies to be viewed while the corresponding sound comment is audibly reproduced.

DISCLOSURE OF THE INVENTION

A first object of the invention is to provide a flat, flexible cartridge which is easy to manufacture and store and in which a disc having transparencies mounted for visual viewing and a sound-recording disc are housed in adjacent and coplanar relation.

Another object of this invention is to provide an audio-visual cartridge which is easy to handle and to position in a reproducing apparatus, in particular by children who are especially expected to use it.

A further object is to provide a flexible cartridge which is not easily damaged or broken.

Yet another object of the invention is to provide a reproducing apparatus designed for the simultaneous viewing of pictures mounted on a picture disc and reproduction of comments corresponding to the pictures recorded on an audio disc.

A further object of the invention is to provide a simple audio-visual reproducing apparatus allowing the easy and reliable positioning of an audio-visual cartridge according to this invention and, if desired, the correct and proper positioning of a conventional picture disc mounting multiple transparencies.

BEST MODE FOR CARRYING OUT THE INVENTION

Referring to the drawings, two alternative forms of cartridges constructed according to the invention are shown in FIGS. 1–3 and 4, respectively, and a preferred apparatus for receiving the cartridges is shown in FIGS. 5–10. In both forms of cartridge, an audio disc and a visual disc are provided, while the apparatus is provided to receive the cartridge and permits viewing of the pictures mounted on the visual disc while simultaneously playing the corresponding sound comments recorded on the audio disc.

Figure 1:
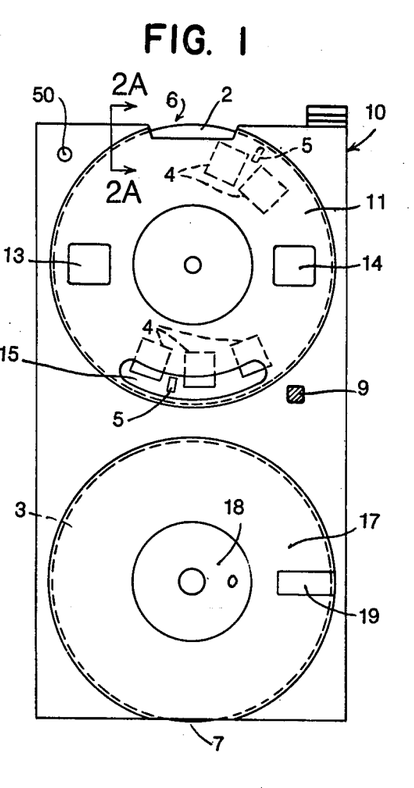
FIG. 1 is a front view of an audio-visual cartridge according to the invention.
Figure 2:
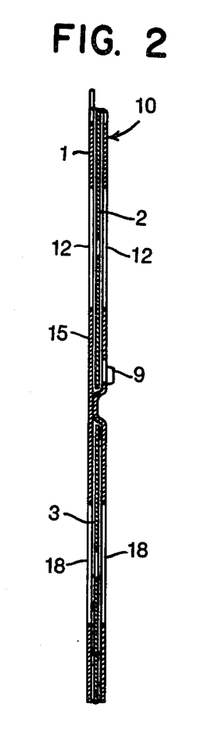
FIG. 2 is a sectional view of the cartridge of FIG. 1 in the plane of lines 2—2.
Figure 2A:
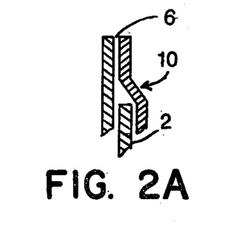
FIG. 2A is a fragmentary sectional view in the plane of lines 2A—2A.
Figure 3:
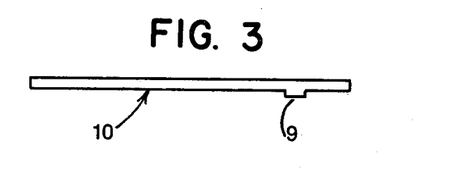
FIG. 3 is an end view of the cartridge of FIG. 1.

Turning first to FIGS. 1–3, an audio-visual cartridge in accordance with this invention is illustrated as being comprised of a flat envelope 1 housing two planar discs 2 and 3. A visual disc 2 carries picture transparencies mounted in a ring for successive viewing and an audio disc 3 carries audio information recorded in sound tracks on the face of the disc. The visual disc is, for example, a conventional disc of the type adapted to be received in a View-Master ® device. This disc has a plurality of windows 4 distributed in a ring about is periphery with each window having a picture transparency mounted therein and a number of driving slots 5 to permit the disc to be rotated about its center in a suitable apparatus in order to successively place each transparency or each pair of stereoscopic transparencies in the angular position for being viewed. The audio disc 3 is a thin disc of a flexible or semi-flexible material, such as plastic, having sound recording tracks, preferably grooves, formed on a face thereof.

The envelope 1 is preferably made of a flexible or semi-flexible material and is formed to provide two flat compartments 11 and 17 having a circular or semi-circular edge conforming to the edges of the discs for accomodating the discs 2 and 3 respectively, which are freely rotatable within the compartments. The envelope is, for example, comprised of two thin sheets of formable plastic material providing spaced opposing walls with, preferably, one of the sheets formed inwardly to define the curved edges of the compartments and bonded to the other sheet, which is flat. This construction provides an envelope with the opposite longitudinal side edges bonded together.

The cartridge 10 in the form shown in FIGS. 1–3 houses two discs which are permanently sealed in the envelope, and in that case the envelope 1 has its opposite ends 6 and 7 bonded together as well as the longitudinal side edges thereof, as illustrated in FIG. 2A. In an alternative embodiment (see FIG. 4), the cartridge houses two discs which are changeable and, in this case, the envelope 1 is formed so that the ends 6 and 7 are open to allow the insertion of discs 2 and 3 into their respective compartments 11 and 17. Small inward protrusions 8 are formed on the inside of the envelope in the compartments in order to retain the discs in their compartments. Preferably, the internal surface of the walls of the envelope comprises a material having a low friction coefficient in order not to interfere with the rotation of the discs, particularly the audio disc 3. Said material can be advantageously chosen so as to provide a suitable cleaning of the audio disc as it rotates.

At the central portion of its two compartments, the walls of the envelope 1 have openings 12 and 18 which are arranged on a common longitudinal axis bisecting the enclosure, allowing the passage of centering means for the discs aligned with the disc center holes; such centering means may also include driving means for the audio disc, which means are part of a reproducing apparatus adapted to receive the cartridge. The envelope also includes windows 13, 14 in both walls of the first compartment housing the picture disc 2 aligned with the ring of transparencies for viewing of stereoscopic pictures, an off-center arcuate opening 15 aligned with the disc drive slots for allowing the driving means for the picture disc 2 access to the slots 5 in the picture disc 2, as well as an opening 19 aligned with the sound tracks for access of audio reading means to the sound tracks on the audio disc 3.

Figure 4:
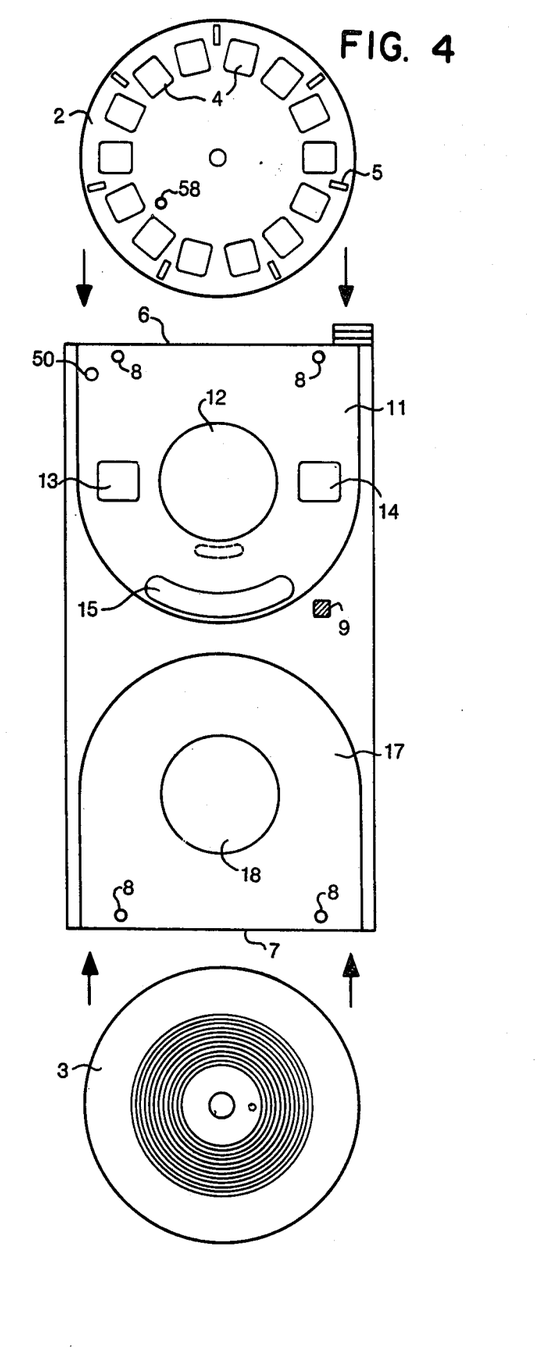
FIG. 4 is an exploded front view of an alternative cartridge construction.

Advantageously, referring to FIGS. 1 and 4, the envelope 1 of the cartridge 10 has an element 9 formed as a protrusion thereon located off-set from the longitudinal and transverse axes bisecting the cartridge to provide a non-symmetrical outer surface and adapted to cooperate with means in the reproducing apparatus to limit the introduction of the cartridge to one orientation, thereby to prevent the introduction into the apparatus either in a reversed position or upside down.

Referring next to FIGS. 5–10, further in keeping with the invention, an apparatus is provided for reproducing individual audio recordings corresponding to particular transparencies while a user views the corresponding transparencies. The apparatus is adapted to receive an audio-visual cartridge of either type shown in FIGS. 1–4.

Figure 5:
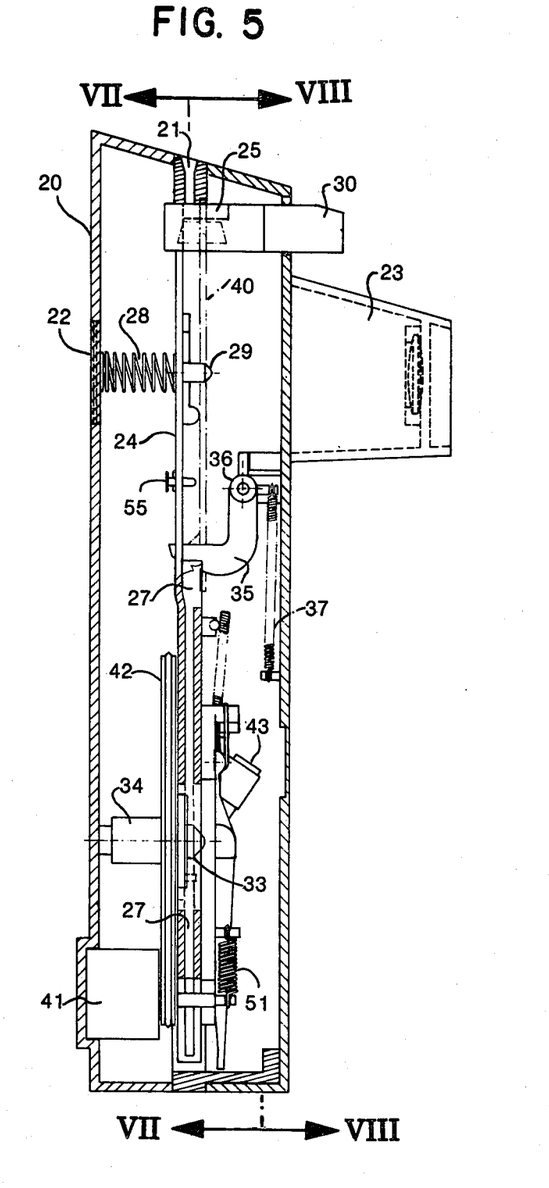
FIG. 5 is a sectional view of an exemplary embodiment of an apparatus according to the invention in operating condition.
Figure 6:
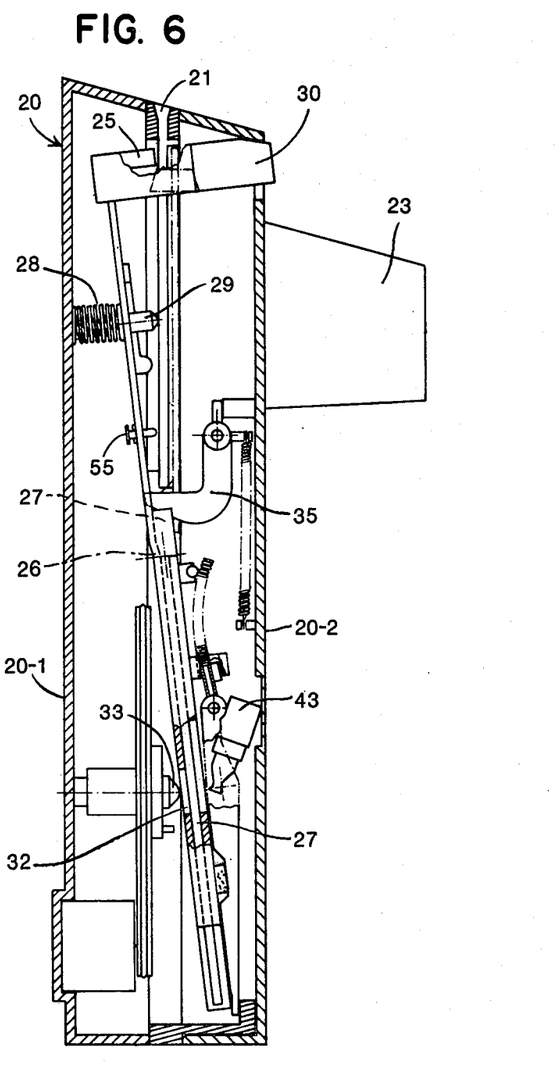
FIG. 6 is a sectional view of an exemplary embodiment of an apparatus according to the invention in non-operating condition with a cartridge removed.

As shown in FIGS. 5 and 6, the apparatus has a housing 20 with an elongated slot 21 in its upper end wall for the insertion of a cartridge of the type illustrated in FIGS. 1–4. The housing is shown as formed of a back section 20-1 and a front section 20-2 joined along a parting line lying in a plane bisecting the housing and forming the operating plane of the cartridge. The apparatus within the housing 20 includes optical means for the viewing of picture transparencies carried by the disc 2 of a cartridge received in the housing 20. The optical means comprise two windows 22 formed in the rear wall of the housing to allow light in and two eye-pieces 23 mounted in the front wall and fitted with lenses to diffuse the light. Within the housing there is a positioning plate 24 for a cartridge to be introduced through the entry slot 21 which positions the cartridge in the operating plane.

The positioning plate 24 is pivotally mounted on a pivot 26 located approximately at the vertical mid point of the plate and its lower portion is formed with a cavity 27 to accomodate the lower section of an audio-visual cartridge 10. The plate 24 is pivotable manually from its normal operating position shown in FIG. 5 against the force of the return spring 28, holding the plate 24 in its normal position, to the insertion position of FIG. 6. Upon insertion of a cartridge, the lower audio disc section moves downward spaced from the face of the plate 24 until it reaches the lower section of the plate. To insert the cartridge, it must be forcibly pushed through the entry slot 21 such that the forward edge of the cartridge enters the cavity 27 in the plate 24. The audio disc section of the cartridge, being flexible, bends around the corner defined by the walls of the plate and the cavity 27, herein shown as joining at about 170 degrees when the plate is pivoted in its insertion position (FIG. 6) and fully enters the cavity 27 in the plate 24 and, when the cartridge is fully inserted, the plate pivots to the position of FIG. 5. The plate 24 has a lug 25 arranged to enter an opening 50 provided in the cartridge as the plate pivots to its operating position of FIG. 6, thereby to assure the correct positioning thereof within the apparatus.

Mounted in the housing are centering means 29, 33 for both the visual disc and the audio disc which engage the discs as the plate 24 pivots to bring the cartridge into its operating plane. The plate 24 carries centering means 29 for the picture disc 2 which enters the center hole of the disc through the access opening 12 in the cartridge. The plate 24 has two openings 31 in registry with the windows 22 when it is in operating position (FIG. 5) and also an opening 32 for the passage of centering means 33 for the audio disc 3. The centering means 33 is secured to the housing through the bearing mount 34 and enters the center hole of the audio disc through the access opening 18 in the cartridge. The plate 24 is fixed in its cartridge insertion position by externally actuable pawl means 30. In order to introduce an audio-visual cartridge 10 (FIG. 1), the pawl 30 is pressed to pivot the plate 24 to the insertion position of FIG. 6 and the cartridge may then be inserted into the opening 21.

In accordance with the invention, provision is made for the apparatus to accept not only an audio-visual cartridge 10 but also a simple disc with mounted stereoscopic transparencies of the type presently sold for viewing in a View-Master ® device. For this purpose, the apparatus is provided with two movable stop elements 35 pivotally mounted about shaft 36 secured to the housing 20, said stop elements being loaded by springs 37 into a normal position to block the disc from passage into the cavity 27 in the lower portion of the plate 24. The ends of the stop elements 35 engage into openings 59 (FIG. 7) provided in the plate 24. The stop elements 35 are located such that, when a disc is introduced through the opening 21, it comes to rest onto the stop elements 35 so as to be centered on the axis 29. When a cartridge 10 is introduced through opening 21, by pressing down on the cartridge 10, it causes the stop elements 35 to move away by pivoting the shaft 36 in the anti-clockwise direction.

In its upper portion, the housing accomodates positioning or driving means to place the picture disc 2 in successive angular positions in order to place the picture transparencies successively in the field of view of the optical means. The positioning or driving means include selector means 40 (visible in front view in FIG. 8) mounted about an axis 38 and actuable from the outside of the apparatus. The selector 40 has a lug 39 which is engagable with the positioning or driving slots 5 in the disc 2 on couterclockwise movement of the selector means to advance the disc 2 from one set of transparencies to the next and is cammed out of the slots 5 on return of the discs by its restore spring 40-1. Slots 5 are arranged in the disc 2, one slot associated with each transparency.

In its lower portion, the housing has mounted therein driving means for the audio disc 3 as well as read and reproducing means for the audio information carried on said disc 3. In keeping with this invention, the driving means for the disc 3 is herein shown as an electric motor 41, coupled by an endless belt to a fly-wheel 42 secured on the bearing element 34 carrying the centering means 33 for the audio disc.

In carrying out the invention, it is desired to synchronize the reading of the sound track on the audio disc with the operation of the picture disc so that individual recordings on the audio disc are played while corresponding transparencies are being viewed. One device for achieving this utilizes the circuit of FIG. 10 to synchronize the start of rotation of the discs and to prevent rotation of the picture disc while an individual sound comment or recording is being played. The read and reproducing means for the audio information recorded on the disc 3, referring to FIGS. 7 and 9, preferably utilize a ceramic pick-up head 43 mounted on a support 44 which is slidable along a guide shaft 45 and positions a needle in the spiral groove forming the recording track on the audio disc 3. The pick-up head is caused to advance by the interaction between the needle and the recording groove.

Figure 7:
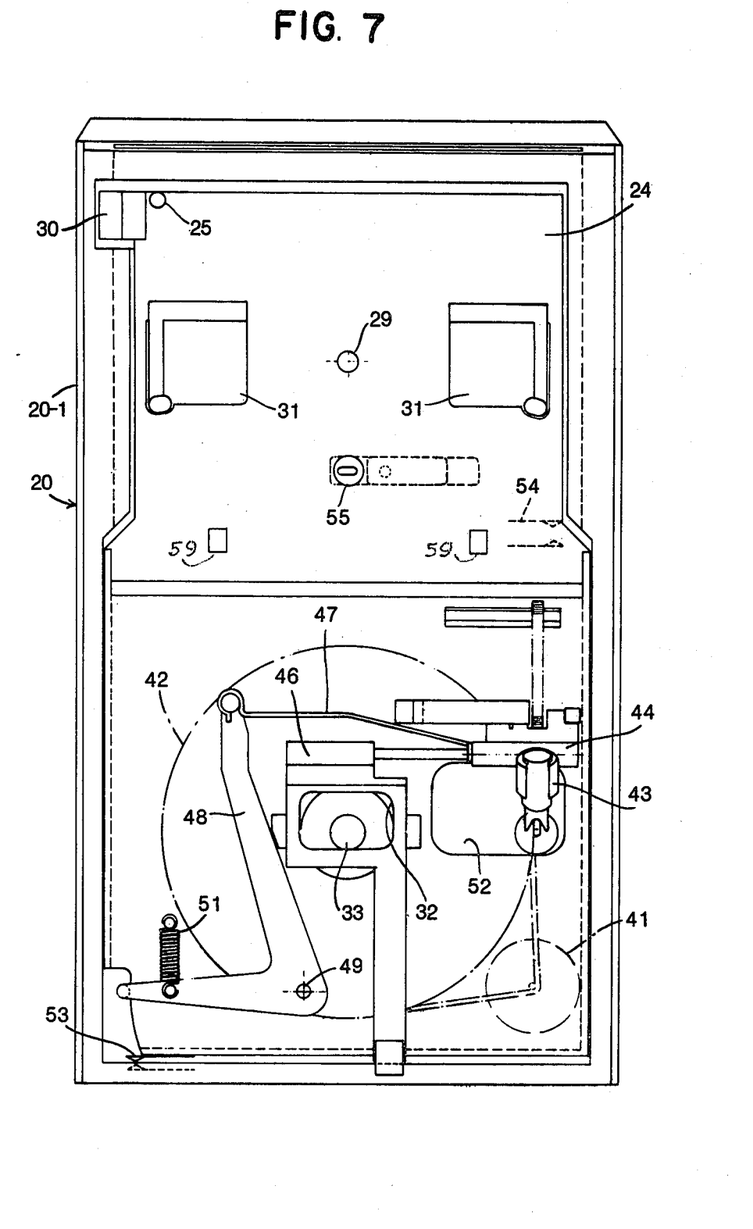
FIG. 7 is a view along line VII—VII of FIG. 5 into the back section of the housing with the front section removed.
Figure 8:
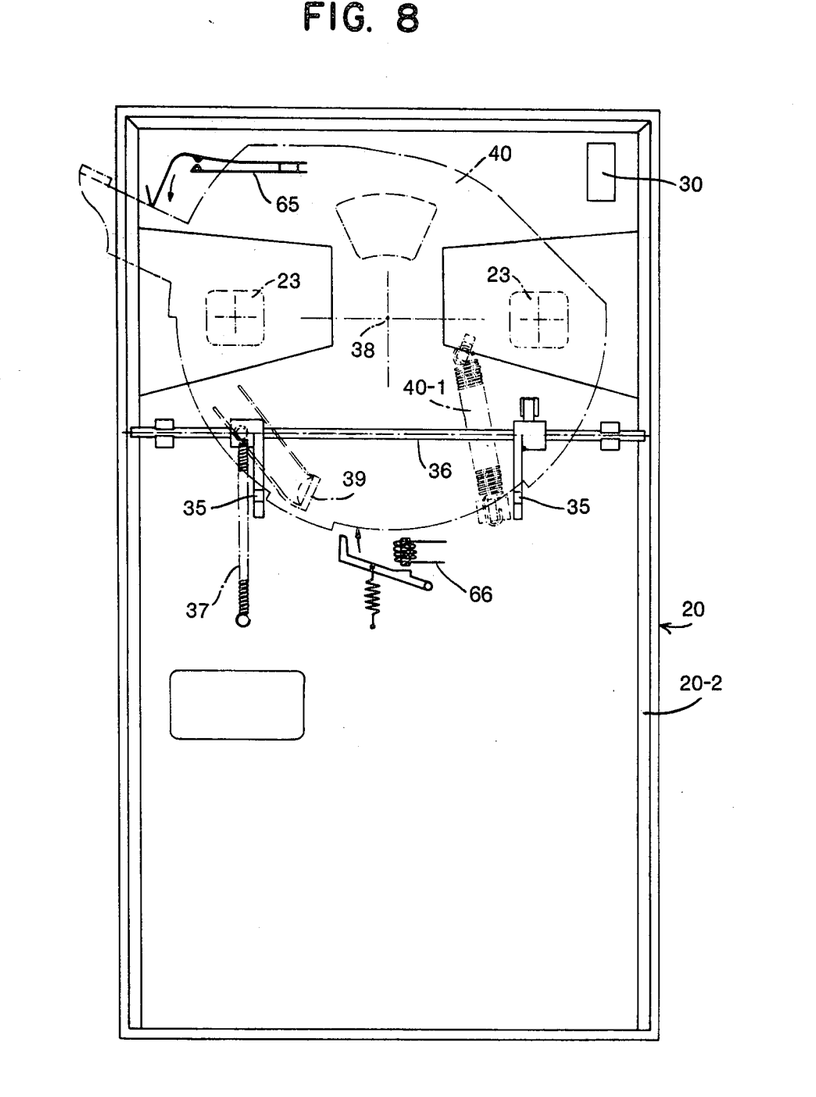
FIG. 8 is a view along line VIII—VIII of FIG. 5 into the front section of the housing with the back section removed.
Figure 9:
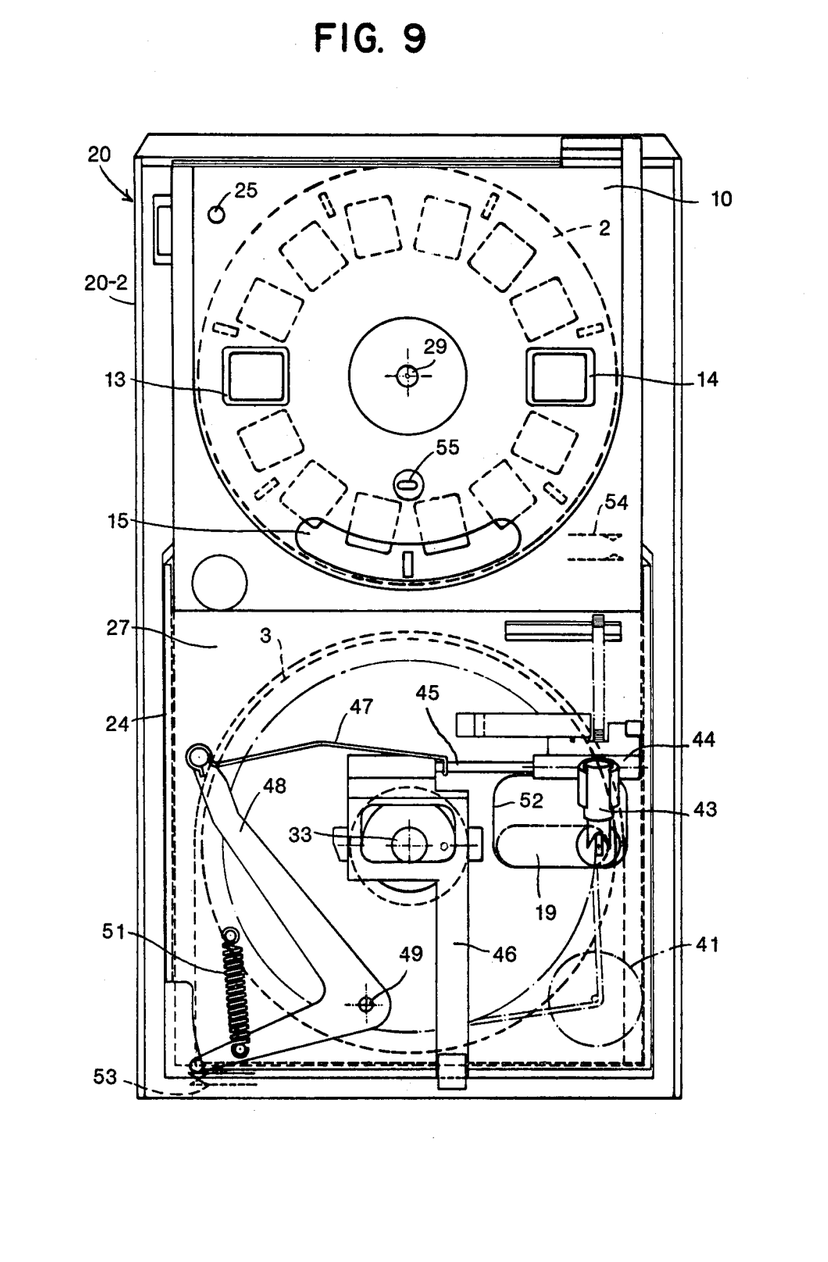
FIG. 9 is a view similar to that of FIG. 8 but with an audio-visual cartridge according to FIG. 1 positioned in the apparatus.
Figure 10:
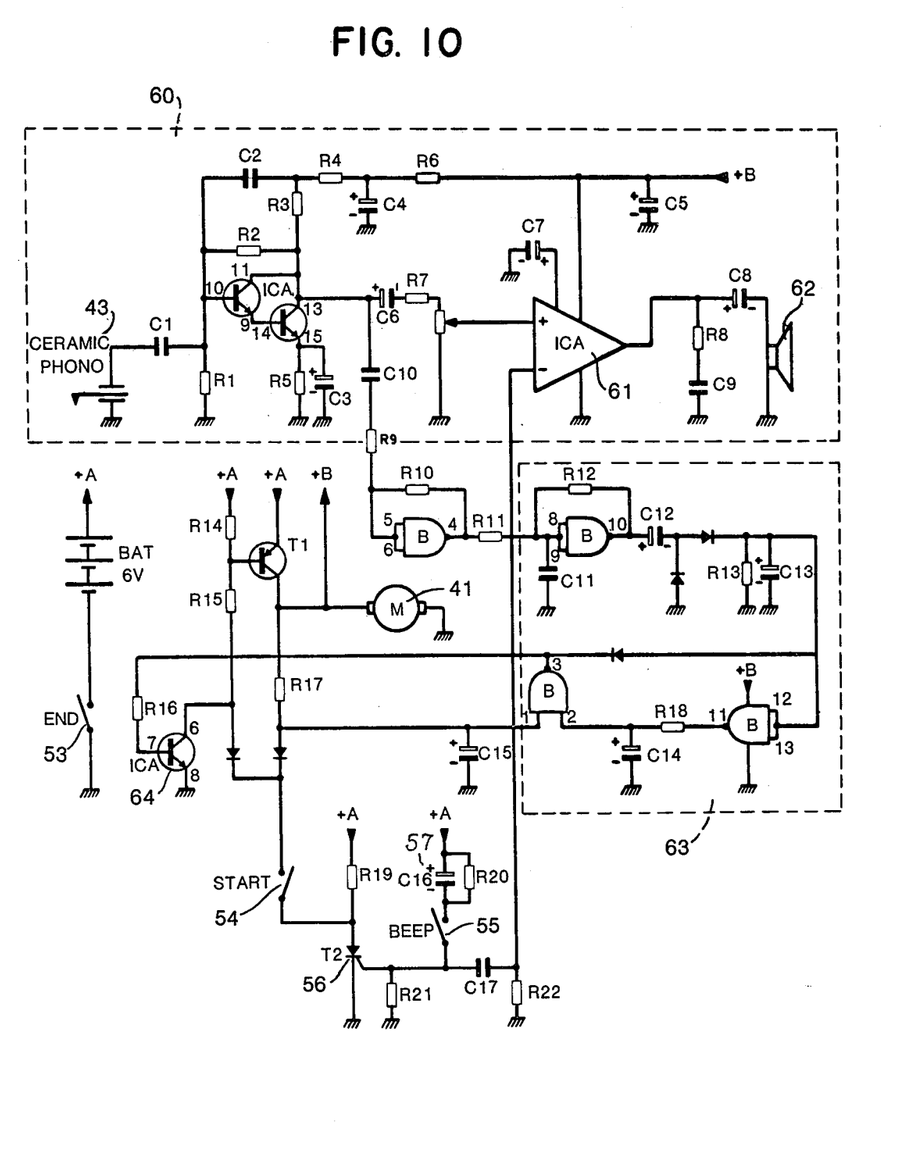
FIG. 10 is a diagram of the electronic circuit for operating the components of the apparatus.

To insure that the pick-up head is in proper position to start reading the recording tracks with no cartridge in the apparatus, a lever 48 under the action of a return spring 51 through a rod 47 traverses the pick-up head support 44 to its start position, shown in FIG. 7.

The outer wall of the cavity 27 for the cartridge in the lower portion of the plate 24 has an opening 52 to permit the pick-up means 43 to access the information recorded on the audio disc 3 of a cartridge 10 when it is positioned in the cavity and in the operating plane. A leg 46 secured to one section of the housing supports the guide shaft 45. The lever 48 is arranged in the housing so as to actuate a switch 53 controlling the electronic audio reproducing circuitry which is connected to the transducer in the pick-up means 43 when a cartridge is inserted into the apparatus. This audio circuitry is diagrammatically represented in FIG. 10 and includes three further switches 54, 55 and 56.

As an audio-video cartridge 10 is inserted and moves to its operating position in the apparatus (FIG. 9), the lever 48 is caused to pivot under the action of the lower edge of the cartridge and actuate the switch 53 to close. The rod 47 is also shifted to the left so as to permit the pick-up head support 44 to traverse the recording tracks on the audio disc 3. When the picture selector 40 is actuated, it causes the switch 54 to switch ON, thereby to close the feed circuit of the drive motor 41 for the audio disc 3. However, the supply voltage +A is not applied to the switch 54 until the SCR switch 56 is fired, which is caused to occur when switch 55 is ON. Switch 55 (FIGS. 5–7) is, for instance, a beep switch located on the positioning plate 24 so as to be switched to ON by index means (e.g., a hole 58, as shown in FIG. 4) provided on the picture disc 2 to indicate that the first picture or the first pair of pictures is placed in the field of view of the eye-pieces 23. The drive motor 41 is thereby caused to rotate the audio disc 3 only when the first picture or the first pair of pictures is in position to be viewed, thus synchronizing the start of rotation of the discs. With the switches 54 and 55 being concurrently ON, a warning signal is generated, the duration of which is defined by the capacitor 57 and said signal is reproduced by the audio circuit 60, including an amplifier 61 and a loudspeaker 62.

When the audio disc 3 is caused to rotate the transducer of the pick-up means 43, preferably a ceramic phonograph pick-up, applies the detected signals to the input terminals of the audio circuitry 60.

Further, in carrying out the aspect of the invention concerned with synchronizing the reading of the sound track on the audio disc with the operation of the picture disc, the detected signals are also applied to the input of a silence detecting circuit 63, having the function of detecting the silences or non-recorded periods in the audio track on the disc 3. When a silence period having, e.g., a duration exceeding three seconds, is detected, the silence detecting circuit 63 produces a signal for driving a transistor switch 64 to OFF, thereby to cut-off the supply feed to the drive motor 41 and the audio circuitry 60. The motor 41 and the audio circuitry 60 are not fed again until the picture selector 40 is actuated again, to make sure that the next sound comment is detected and reproduced by the audio circuitry 60 only when the next picture or the next pair of pictures is positioned to be viewed. This mechanism repeats at every actuation of the picture selector 40. The arrangement described above thereby ensures the desired coordination between the movement of the discs to synchronize the sound comments recorded on the audio disc and the pictures carried by the picture disc.

In order to maintain the synchronization, the device also includes means to prevent operation of the picture selector 40 as long as a sound comment is being reproduced by the audio circuitry 60. This is a two state device. In a preferred embodiment, a switch 65 and an electromagnet coil 66 are connected in the feed circuit with the following purpose. As long as the picture selector 40 is in rest position, the switch 65 is OFF and the coil 66 is not fed, thereby to save energy. When the picture selector 40 is actuated during the time a comment is reproduced, that is, as long as the silence detecting circuit 63 has not detected silence between two succeeding comments, the switch 65 is closed and thus the coil 66 is fed and moves the adjacent latch (FIG. 8) into a notch on the periphery of the picture disc to prevent the picture selector 40 from further movement. The picture selector 40 is urged into rest position under the action of spring 40-1 without having caused the picture disc to rotate. The synchronization between the pictures and the sound comments is thereby maintained by using circuit means which have no energy consumption except when the user makes a wrong manuever.

Power to the apparatus is provided by a +6 VDC power supply which may be battery furnished or rectified AC.

Figure 11:
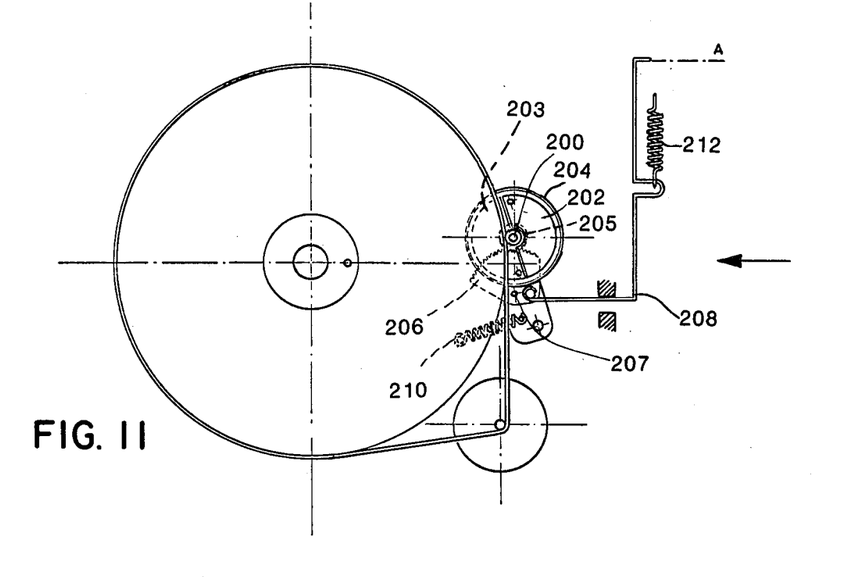
FIGS. 11–13 are views of an alternative form of device for synchronizing the rotation of the discs.
Figure 12:
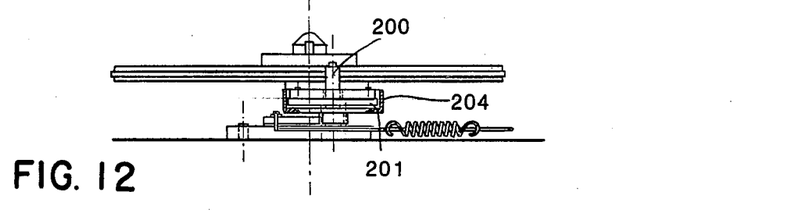
Figure 13:
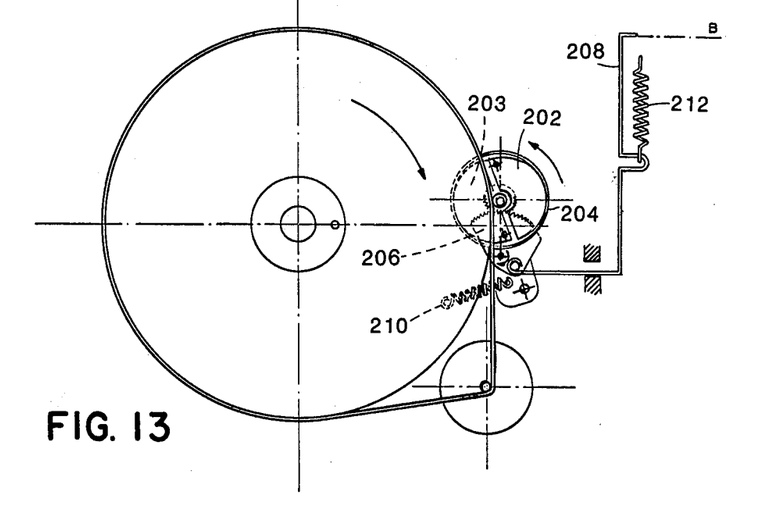

As an alternative and preferred device for synchronizing the rotation of the discs, a mechanical device is provided. The same means described above to coordinate the start of rotation of the discs is employed. Furthermore, the device prevents operation of the picture selector while a sound recording is reproduced. Referring to FIGS. 11–13, the mechanical device includes a lever 208 movably mounted on the frame adjacent to where the picture disc is held in operating position. This is a two state device. Responsive to rotation of the audio disc, torque is transmitted from the audio disc to pivot the lever 208 from a rest position "A" (FIG. 11) to a "B" state (FIG. 13) where the lever can mask the drive slot normally entered by the picture selector 40 and block the entry of the picture selector into driving relation with the picture disc. Thus, when sound comments are being played, the picture selector is prevented from rotating the picture disc; when the audio disc stops rotating, at the end of any recorded comment, the lever 208 is allowed to be urged by the return spring 212 to the rest state "A" unmasking the drive slot. Both the mechanical device of FIGS. 11-13 and the electrical device of FIG. 10 serve the same purpose of linking the rotation of the picture disc to the playing of the recordings on the audio disc to synchronize the viewing of the transparencies with the playing of the corresponding sound comments or passages from the audio disc.

To position the lever 208, the device includes a plate 201 rotated by axle 200 cooperating with the periphery of the audio disc drive means through pressure of a spring 210. During rotation, both moving semicircular parts 202, 203 tend to lock against the periphery of the cup 204, which is thus rotated by friction. Said cup includes a gear 205 meshing with a geared sector 206 rotating around axis 207 and driving the lever 208. When the audio disc drive rotates (FIG. 2), the lever 208 is in position "B" and can either lock the picture disc driving means (selector 40) or be positioned in between lug 39 and off-center drive slots 5 of picture disc 2 so as to disconnect them. When the audio disc drive means are stopped (FIG. 11), the return spring 212 moves lever 208 to rest position "A" so as to either unlock selector 40 or reestablish cooperation of lug 39 with slots 5.

I claim:

1. An audio-visual cartridge comprising:
   a flat envelope formed by two spaced opposing sheets joined at edges;
   one of said sheets being flat and the other being shaped to form flat coplanar first and second substantially circular internal compartments between opposing walls formed by said sheets, said compartments having central portions arranged on a common longitudinal axis bisecting said envelope;
   first and second planar information carrying discs arranged in coplanar relation within said compartments;
   said first disc being freely rotatable within said first compartment about an axis extending through the central portion thereof and carrying a plurality of picture transparencies mounted in a ring for successive viewing on rotation of said first disc;
   said second disc being freely rotatable within said second compartment about an axis extending through the central portion thereof and having sound recording tracks on a face thereof for reproduction of sound recordings corresponding, respectively, to said picture transparencies on rotation of said second disc;
   both discs having center holes and said envelope having:
   aligned openings centrally located in both walls of both said internal compartments aligned with said disc center holes for access of a centering means for said discs to said disc center holes;
   aligned viewing windows in both walls of said first compartment aligned with the ring of picture transparencies carried by said first disc for viewing picture transparencies carried thereby;
   an opening in a wall of said second compartment aligned with the sound recording tracks on said second disc for access of an audio reading means to said tracks;
   a positioning slot in said first disc associated with each of said picture transparencies;
   an opening in a wall of said first compartment for access of a positioning member to said positioning slots in said first disc;
   an indexing means in said first disc at a location representing the angular location of one said picture transparencies, and
   an indexing opening in one wall of said first compartment for access of an indicating means to said indexing means when aligned with said indexing opening and representing that given picture transparencies are in position for viewing through said viewing windows in said envelope.

2. The cartridge according to claim 1 wherein said envelope and said second disc are sufficiently flexible to bend around a corner defined by walls joining at about 170 degrees.

3. The combination according to claim 1 including an element on said envelope of said cartridge located to provide a non-symmetrical outer surface and adapted to cooperate with a means in said apparatus receiving said cartridge to limit the introduction of the cartridge to a single orientation.

4. The combination according to claim 1 wherein said envelope of said cartridge has open ends and a wall of each compartment is provided with at least one protrusion to retain a disc in its respective compartment.

5. The combination according to claim 1 wherein said flat first and second internal compartments of said cartridge formed by said sheets have semi-circular edges substantially conforming to said first and second discs respectively.

6. The combination according to claim 1 wherein said flat envelope of said cartridge is provided by spaced sheets of flexible material, said sheets are joined at edges and at least one of said sheets is formed to provide a pair of flat internal compartments having curved edges substantially conforming to said first and second discs respectively, and having formed portions to retain a disc in its respective compartment.

7. An apparatus for reproducing recordings while a user reads visual information on discs in an audio-visual cartridge, said cartridge comprising a flat envelope containing two discs arranged in coplanar relation, each having center portions, the first disc carrying a plurality of picture transparencies having visual information and the second disc having sound recording tracks on a face thereof, the wall of said envelope having openings for access to the center portions and information on said discs, said apparatus comprising:
   a housing having an opening for the insertion of the cartridge edgewise toward an operating plane within said housing;
   optical means carried by said housing for viewing the transparencies through said access openings upon rotation of said first disc;
   first centering and driving means mounted in said housing adjacent said operating plane and engageable with said first disc through said access openings for rotating said first disc to place said transparencies in succeeding angular positions;
   audio means carried by said housing adjacent said operating plane and accessible to said second disc through said access openings for reading and audibly reproducing the audio information recorded in said tracks on said second disc upon rotation thereof;
   second centering and driving means mounted in said housing adjacent said operating plane and engageable with said second disc through said access openings for rotating said second disc; and cartridge positioning means including a pivotally mounted plate movable from an insertion position inclined to said operating plane to an operating position in said operating plane and operable by pivotal movement of said plate to guide a cartridge inserted into the apparatus into an operating position in said operating plane with said discs contained therein in engagement with said first and second centering and driving means and into position for access of said optical means and said audio means through said access openings.

8. An apparatus according to claim 7 including a device for synchronizing the rotation of the discs so that individual recordings on the audio disc are played while corresponding transparencies are being viewed, said audio means having a transducer which detects signals from the sound track;

said device including a silence detecting circuit for receiving said signals and detecting periods of silence in the sound track on the audio disc;

means responsive to the detection of a silence period of predetermined duration for cutting off the power supply to said audio disc drive means; and means responsive to the rotation of the visual disc a distant sufficient to locate another picture in the field of view of the optical means, to re-connect the power supply to said audio disc drive means, thereby to synchronize the individual recordings on the audio disc and the transparencies carried by the visual disc.

9. An apparatus according to claim 8 including means responsive to the detection of signals from the sound track to prevent rotation of said visual disc while an individual recording is being reproduced, to maintain synchronization.

10. Apparatus according to claim 7 further including means enabling said apparatus to accept a disc with multiple transparancies and position said disc in operating position accessible to said optical reading means said enabling means comprising stop elements movably mounted in said housing adjacent said cartridge positioning means in the path of a cartridge and movable out of said path by a cartridge inserted through said housing opening, said stop elements being engageable by a disc inserted through said housing opening to hold said disc in operating position.

11. Apparatus according to claim 7 including means responsive to the rotation of said audio disc drive means to restrain said picture disc against rotation as long as said audio disc drive means are powered.

12. An apparatus according to claim 7 wherein means are provided on said plate to slidably receive a portion of a cartridge containing said second disc, said plate carries said first centering means for said first disc, and said plate includes an opening for the passage of said second centering means for said second disc.

13. An apparatus according to claim 12 wherein said plate has means including a cavity to slidably receive said portion of a cartridge and is mounted for movement about a pivot axis located at substantially the mid point thereof.

14. Apparatus according to claim 13 further including means enabling said apparatus to accept a disc with multiple transparencies and position said disc in operating position accessible to said optical reading means, said enabling means comprising stop elements movably mounted in said housing adjacent said cartridge positioning means in the path of a cartridge and movable out of said path by a cartridge inserted through said housing opening, said stop elements being engageable by a disc inserted through said housing opening to hold said disc in operating position.

15. Apparatus according to claim 12 further including means enabling said apparatus to accept a disc with multiple transparencies and position said disc in operating position accessible to said optical reading means, said enabling means comprising stop elements movably mounted in said housing adjacent said cartridge positioning means in the path of a cartridge and movable out of said path by a cartridge inserted through said housing opening, said stop elements being engageable by a disc inserted through said housing opening to hold said disc in operating position.

16. An apparatus according to claim 7 having a device for synchronizing the rotation of said discs so that individual recordings corresponding to transparencies are reproduced while the corresponding transparencies are located for viewing by preventing the rotation of said first disc to advance a new set of transparencies for viewing while said second disc having a sound track is rotated to reproduce the audio recorded thereon.

17. An apparatus according to claim 7 wherein said positioning means comprises a plate carrying said first driving means and pivotally mounted in said housing between an insertion position for receiving a cartridge and a position locating said cartridge in said operating plane to shift said first driving means into drive relation with said first disc in said cartridge.

18. Apparatus according to claim 17 further including means enabling said apparatus to accept a disc with multiple transparencies and position said disc in operating position accessible to said optical reading means, said enabling means comprising stop elements movably mounted in said housing adjacent said cartridge positioning means in the path of a cartridge and movable out of said path by a cartridge inserted through said housing opening, said stop elements being engageable by a disc inserted through said housing opening to hold said disc in operating position.

19. An apparatus according to claim 17 including a device for coordinating the rotation of said discs so that individual recordings on the audio disc are played while corresponding transparencies are being viewed by preventing the rotation of said first disc to advance a new set of transparencies for viewing while said second disc having a sound track is rotated to reproduce the audio recorded therein.

20. Apparatus according to claim 19 further including means enabling said apparatus to accept a disc with multiple transparencies and position said disc in operating position accessible to said optical reading means, said enabling means comprising stop elements movably mounted in said housing adjacent said cartridge positioning means in the path of a cartridge and movable out of said path by a cartridge inserted through said housing opening, said stop elements being engageable by a disc inserted through said housing opening to hold said disc in operating position.

21. An apparatus according to claim 17 wherein said device includes an electronic circuit having a switch on said plate actuable by an index means associated with said visual disc to indicate that the selected picture of a plurality mounted on said visual disc is placed in the reading field of said optical means;

said electronic circuit having a power supply connected to said audio disc drive means upon actuation of said switch to rotate said audio disc only when the selected picture is in position to be viewed, thus synchronizing the rotation of the discs.

22. An apparatus according to claim 21 including a device for synchronizing the rotation of the discs so that individual recordings on the audio disc are played while corresponding transparencies are being viewed, said audio means having:

a transducer which detects signals from the sound track;

said device including a silence detecting circuit for receiving said signals and detecting periods of silence in the sound track on the audio disc;

means responsive to the detection of a silence period of predetermined duration for cutting off the power supply to said audio disc drive means; and means responsive to the rotation of the visual disc as distance sufficient to locate another picture in the field of view of the optical means, to re-connect the power supply to said audio disc drive means, thereby to synchronize the individual recordings on the audio disc and the transparencies carried by the visual disc.

23. Apparatus according to claim 21 further including means enabling said apparatus to accept a disc with multiple transparencies and position said disc in operating position accessible to said optical reading means, said enabling means comprising stop elements movably mounted in said housing adjacent said cartridge positioning means in the path of a cartridge and movable out of said path by a cartridge inserted through said housing opening, said stop elements being engageable by a disc inserted through said housing opening to hold said disc in operating position.

24. An apparatus according to claim 17 including a device for synchronizing the rotation of the discs so that individual recordings on the audio disc are played while corresponding transparencies are being viewed, said audio means having:

a transducer which detects signals from the sound track;

said device including a silence detecting circuit for receiving said signals and detecting periods of silence in the sound track on the audio disc;

means responsive to the detection of a silence period of predetermined duration for cutting off the power supply to said audio disc drive means; and means responsive to the rotation of the visual disc as distance sufficient to locate another picture in the field of view of the optical means, to re-connect the power supply to said audio disc drive means, thereby to synchronize the individual recordings on the audio disc and the transparencies carried by the visual disc.

25. In combination:

(1) an apparatus for reproducing sound recordings while a user views visual information on discs in an audio-visual cartridge, and (2) a cartridge comprising a flat envelope containing two information containing discs arranged in coplanar relation, said envelope having spaced opposing walls joined at edges and means forming flat coplanar first and second internal compartments between said opposing walls, said compartments having central openings arranged on a common longitudinal axis bisecting said envelope, the first disc comprising a picture disc having a plurality of stereo pairs of picture transparencies and the second disc comprising an audio disc having sound recordings on a face thereof, said walls of said envelope having openings for access to the information on said discs; said apparatus comprising:

a housing having an opening for the insertion of said cartridge to an operating plane; P2 optical means carried by said housing including means for transmitting light through a pair of said envelope wall openings and through a single stereo pair of said picture transparencies to permit the viewing of said single stereo pair of transparencies on said picture disc;

first driving means for rotating said picture disc to successively bring other stereo pairs of transparencies into view through said optical means;

audio means carried by said housing for reading and audibly reproducing the recordings on said audio disc upon rotation thereof;

second driving means for rotating said audio disc; and cartridge positioning means for receiving and guiding a cartridge inserted into the apparatus to an operating position in said operating plane with said discs engaged through said envelope wall openings and in drive relation with said first and second driving means, and wherein the information carried by said first and second discs respectively is accessible to the viewing and reading means through said optical means and envelope wall openings.

26. The combination according to claim 25 wherein said envelope of said cartridge is flexible, wherein both discs have center holes and at least one of said discs has an off center drive slot, and said second disc has recording tracks extending a radial distance from the center hole in said second disc, and said envelope has aligned openings centrally located in both walls of both said internal compartments aligned with said disc center holes;

aligned windows in both walls of said first compartment offset from the central portion thereof and aligned with the ring of picture transparencies carried by said first disc;

an opening in a wall of at least one of said internal compartments aligned with said disc drive slot; and an off center opening in a wall of said second compartment extending in a radial direction relative to the center of said compartment and being aligned and coextensive with the sound recording tracks on said second disc.

27. The combination according to claim 25 wherein said envelope of said cartridge is flexible, wherein both discs have center holes and said first disc has an off center drive slot, and said envelope has aligned openings centrally located in both walls of both said internal compartments aligned with said disc center holes for access of said centering means for said discs to said disc center holes;

aligned windows in both walls of said first compartment aligned with the ring of picture transparencies carried by said first disc for viewing the picture transparencies carried thereby;

openings in a wall of both said internal compartments for access of said driving means to said discs including a driving means to said first disc drive slot; and an opening in a wall of said second compartment aligned with the sound recording tracks on said second disc for access of an audio reading means to said tracks.

28. The combination according to claim 25 including an element on said envelope of said cartridge located to provide a non-symmetrical outer surface and adapted to cooperate with a means in said apparatus receiving said cartridge to limit the introduction of the cartridge to a single orientation.

29. The combination according to claim 25 wherein said envelope of said cartridge has open ends and a wall of each compartment is provided with at least one protrusion to retain a disc in its respective compartment.

30. The combination according to claim 25 wherein said flat first and second internal compartments of said cartridge formed by said means have semi-circular edges substantially conforming to said first and second discs respectively, wherein both said discs have center holes and at least one of said discs has an off center drive slot, and said envelope has openings centrally located in walls of said internal compartments aligned with said center holes;
aligned windows in both walls of said first compartment aligned with the ring of transparencies carried by said first disc;
an opening in a wall of at least one of said compartments aligned with said disc drive slot; and
an opening in a wall of said second compartment aligned with the sound recording tracks on said second disc.

31. The combination according to claim 25 wherein said envelope of said cartridge is sufficiently flexible to bend around a corner defined by walls joining at about 170 degrees.

32. The combination according to claim 25 wherein said flat envelope of said cartridge is provided by spaced sheets of flexible material, said sheets are joined at edges and at least one of said sheets is formed to provide a pair of flat internal compartments having curved edges substantially conforming to said first and second discs respectively, and having formed portions to retain a disc in its respective compartment.

33. An apparatus for reproducing recordings while a user reads visual information on discs in an audio-visual cartridge, said cartridge comprising a flat envelope containing two information containing discs arranged in coplanar relation, the first picture disc having a plurality of pictures and the second audio disc having recordings, the walls of said envelope having openings for access to the information on said discs, said apparatus comprising:

a housing having an opening for the insertion of the cartridge;
optical means carried by said housing for viewing the pictures on said picture disc;
first driving means for rotating said picture disc to successively bring said pictures into view through said optical means;
audio means carried by said housing for reading and audibly reproducing the recordings on said audio disc upon rotation thereof;
second driving means for rotating said audio disc;
cartridge positioning means for receiving and guiding a cartridge inserted into the apparatus to operating position wherein the information carried by said first and second discs respectively are accessible to the respective reading means through said access openings; and
a device for synchronizing the rotation of said discs so that individual recordings on the audio disc are played while corresponding transparencies on said picture disc are viewed by preventing the rotation of said picture disc during the rotation of the audio disc.

34. Apparatus according to claim 33 wherein said device is an electronic device.

35. Apparatus according to claim 33 wherein said device is a two state device having one state preventing the rotation of the picture disc and a second state allowing the rotation of the picture disc, and means responsive to rotation of said audio disc to shift said device to said first state.

36. In combination, an apparatus for reproducing recordings while a user reads visual information on discs in an audio-visual cartridge, and a cartridge comprising a flat envelope containing two information containing discs arranged in coplanar relation, the first picture disc having a plurality of pictures and the second audio disc having recordings, the walls of said envelope having openings for access to the information on said discs, said apparatus comprising:

a housing having an opening for the insertion of the cartridge;
optical means carried by said housing for viewing the pictures on said picture disc;
first driving means for rotating said picture disc to successively bring said pictures into view through said optical means;
audio means carried by said housing for.reading and audibly reproducing the recordings on said audio disc upon rotation thereof;
second driving means for rotating said audio disc;
cartridge positioning means for receiving and guiding a cartridge inserted into the apparatus to operating position wherein the information carried by said first and
a device for synchronizing the rotation of said discs so that individual recordings on the audio disc are played while corresponding transparencies on said picture disc are viewed by preventing the rotation of said picture disc during the rotation of the audio disc.

37. In combination:
(1) an apparatus for reproducing sound recordings while a user views visual information on discs in an audio-visual cartridge, and
(2) a cartridge comprising a flat envelope containing two information containing discs arranged in coplanar relation, said envelope having spaced opposing walls joined at edges and means forming flat coplanar first and second internal compartments between said opposing walls, said compartments having central openings arranged on a common longitudinal axis bisecting said envelope, the first disc comprising a picture disc having a plurality of picture transparencies arranged in a ring and the second disc comprising an audio disc having sound recordings on a face thereof, said walls of said envelope having openings for access to the information on said discs; said apparatus comprising:

a housing having an opening for the insertion of said cartridge to an operating plane;

optical means carried by said housing including means for transmitting light through a pair of said envelope wall openings and through the first of said picture transparencies to permit the viewing of said first transparencies on said picture disc;

first driving means for rotating said picture disc to successively bring other transparencies arranged in said ring into view through said optical means;

audio means carried by said housing for reading and audibly reproducing the recordings on said audio disc upon rotation thereof;

second driving means for rotating said audio disc; and cartridge positioning means for receiving and guiding a cartridge inserted into the apparatus to an operating position in said operating plane with said discs engaged through said envelope wall openings and in drive relation with said first and second driving means, and wherein the information carried by said first and second discs respectively is accessible to the viewing and reading means through said optical means and envelope wall openings.

* * * * *